(12) United States Patent
Maria

(10) Patent No.: US 11,606,624 B2
(45) Date of Patent: Mar. 14, 2023

(54) METHOD AND APPARATUS FOR OPERATING AN ON-DEMAND VIDEO GATEWAY

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 21 days.

(21) Appl. No.: 17/078,651

(22) Filed: Oct. 23, 2020

(65) Prior Publication Data

US 2022/0132219 A1 Apr. 28, 2022

(51) Int. Cl.
| | |
|---|---|
| H04N 21/6334 | (2011.01) |
| H04N 21/4405 | (2011.01) |
| H04N 21/44 | (2011.01) |
| H04N 21/61 | (2011.01) |
| H04W 12/08 | (2021.01) |
| H04W 12/00 | (2021.01) |
| H04L 9/06 | (2006.01) |
| H04W 12/033 | (2021.01) |
| H04W 88/16 | (2009.01) |
| H04W 84/04 | (2009.01) |
| H04L 9/00 | (2022.01) |

(52) U.S. Cl.
CPC ..... *H04N 21/63345* (2013.01); *H04L 9/0637* (2013.01); *H04N 21/44* (2013.01); *H04N 21/4405* (2013.01); *H04N 21/6131* (2013.01); *H04W 12/033* (2021.01); *H04W 12/08* (2013.01); *H04L 9/50* (2022.05); *H04W 84/042* (2013.01); *H04W 88/16* (2013.01)

(58) Field of Classification Search
CPC ............ H04N 21/63345; H04N 21/44; H04N 21/4405; H04N 21/6131; H04L 9/0637; H04L 2209/38; H04L 9/50; H04W 12/033; H04W 12/08; H04W 84/042; H04W 88/16

See application file for complete search history.

(56) References Cited

U.S. PATENT DOCUMENTS

| | | | |
|---|---|---|---|
| 10,361,843 B1 * | 7/2019 | Suthar | G06Q 20/401 |
| 10,491,376 B1 * | 11/2019 | Suthar | H04L 9/0637 |
| 11,070,487 B2 * | 7/2021 | Hoffmann | G06F 16/951 |
| 2016/0099857 A1 * | 4/2016 | Begwani | H04L 43/08 370/252 |
| 2020/0053026 A1 * | 2/2020 | Rangachari | H04L 45/44 |
| 2020/0059761 A1 * | 2/2020 | Li | H04W 12/06 |
| 2020/0196201 A1 * | 6/2020 | Lee | H04W 36/0022 |
| 2020/0221299 A1 * | 7/2020 | Suthar | G06F 16/1824 |
| 2020/0344606 A1 * | 10/2020 | Zaus | H04W 36/0022 |
| 2021/0160314 A1 * | 5/2021 | Parvataneni | H04L 67/1046 |

* cited by examiner

*Primary Examiner* — Alazar Tilahun
(74) *Attorney, Agent, or Firm* — Guntin & Gust, PLC; Douglas Schnabel

(57) ABSTRACT

Aspects of the subject disclosure may include, for example, a user device that attaches to a radio access network of a mobile network and requests services. The user device creates a virtual network function on the device to support the service. The virtual network function may include a user plane virtual network function, a control plane virtual network function, or both. Other embodiments are disclosed.

20 Claims, 10 Drawing Sheets

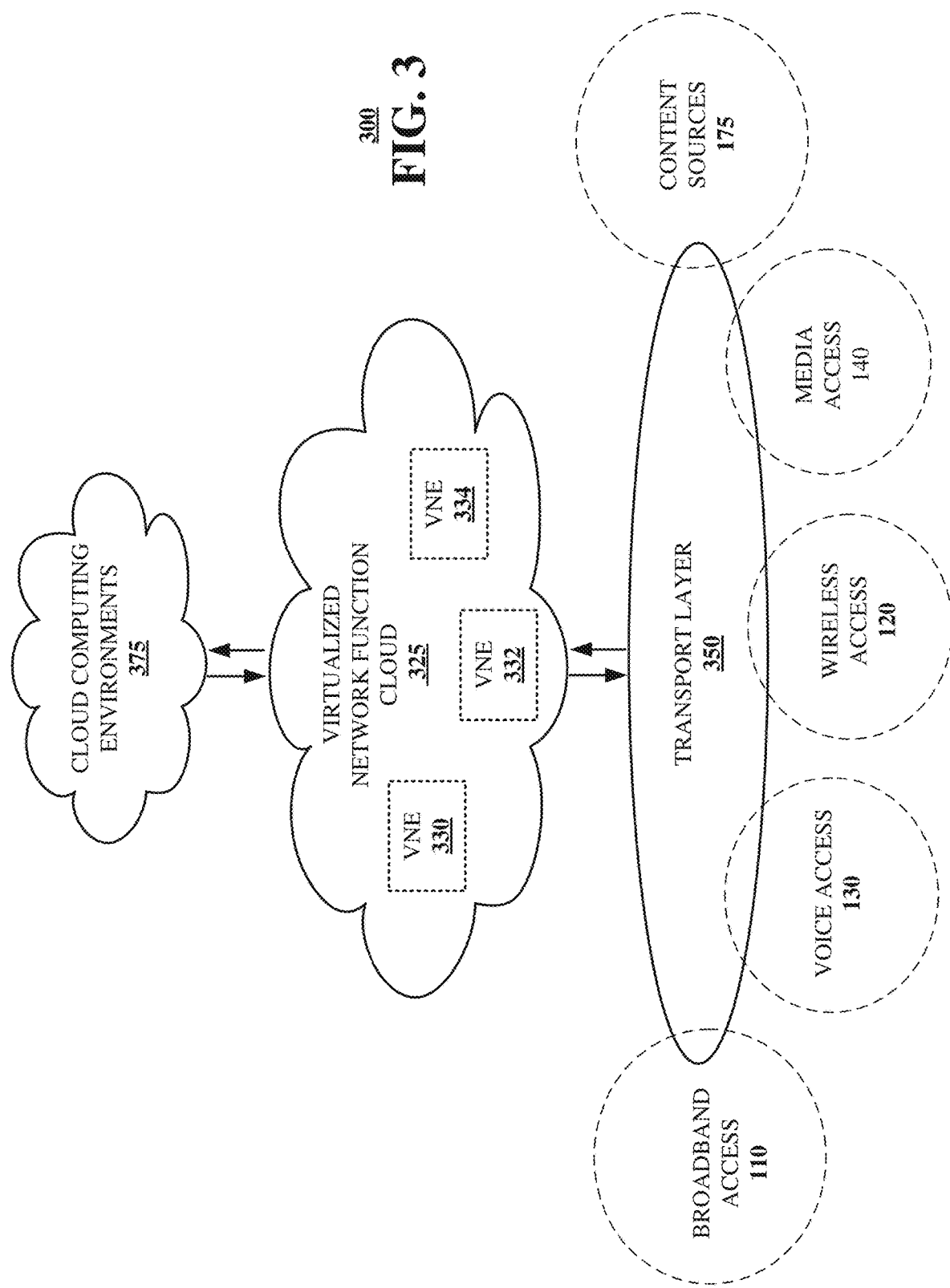

US 11,606,624 B2
// 1

METHOD AND APPARATUS FOR OPERATING AN ON-DEMAND VIDEO GATEWAY

FIELD OF THE DISCLOSURE

The subject disclosure relates to virtual network functions in mobile networks.

BACKGROUND

Control and User Plane Separation (CUPS) in 4G and 5G networks allow control plane functions and user plane functions to scale separately and more efficiently. The CUPS architecture also enables carriers to implement user plane S-Gateways and user plane P-Gateways either at the edge of a carrier network or at an enterprise premises. Moving the gateways to the edge of a network improves performance and reduces latency. However, it doesn't resolve the performance and latency associated with millions of devices downloading and playing video content.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for the creation of virtual network functions in user devices. A user device that attaches to a radio access network of a mobile network may establish a connection with a control plane function in the mobile network and then request a service such as streaming video or some other high bandwidth service. The mobile network provides authorization for the service, and the user device creates a virtual network function locally on the user device. The virtual network function may be a user plane virtual network function, a control plane network function, or both. The user device may maintain a blockchain to maintain a ledger of virtual network functions and to provide authentication services. Other embodiments are described in the subject disclosure.

One or more aspects of the subject disclosure include a device having a processing system including a processor, and a memory that stores executable instructions that, when executed by the processing system, facilitate performance of operations. Example operations attaching to a radio access network of a mobile network, requesting a service from the mobile network, receiving authorization from the mobile network to create a user plane virtual network function on the device, creating the user plane virtual network function on the device; creating a blockchain entry on the device to record creation of the user plane virtual network function, and receiving data related to the service at the user plane virtual network function on the device.

One or more aspects of the subject disclosure include a non-transitory machine-readable medium having instructions stored thereon, that when executed by a processor, result operations being performed. Example operations include receiving, at a control plane function in a mobile network, a request, from a user device attached to a radio access network of the mobile network, to create a user plane virtual network function on the user device, authorizing creation of the user plane virtual network function on the user device, and providing control plane communication across the radio access network to provide control to the user plane virtual network function on the user device.

One or more aspects of the subject disclosure include a method. The method may include actions, including receiving, by a processing system including a processor and at a control plane function in a mobile network, a request for a service from a user device attached to a radio access network of the mobile network, determining, by the processing system, that the user device is provisioned for the service, authorizing, by the processing system, creation of a user plane virtual network function on the user device, and issuing, by the processing system, a blockchain entry to the user device to create a ledger entry recording creation of the user plane virtual network function on the user device.

Figure 1:
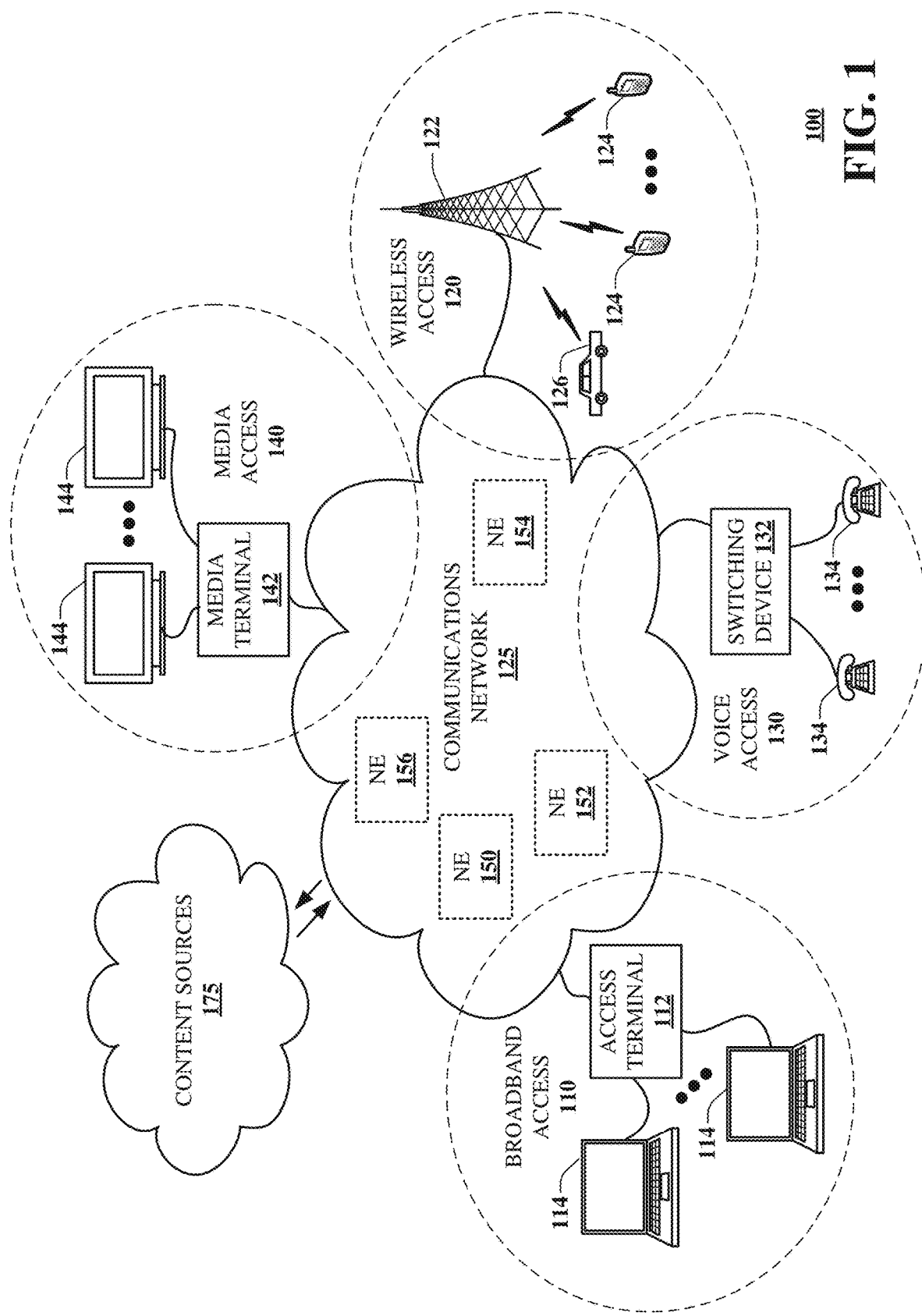
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part the creation of virtual network functions in mobile devices. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
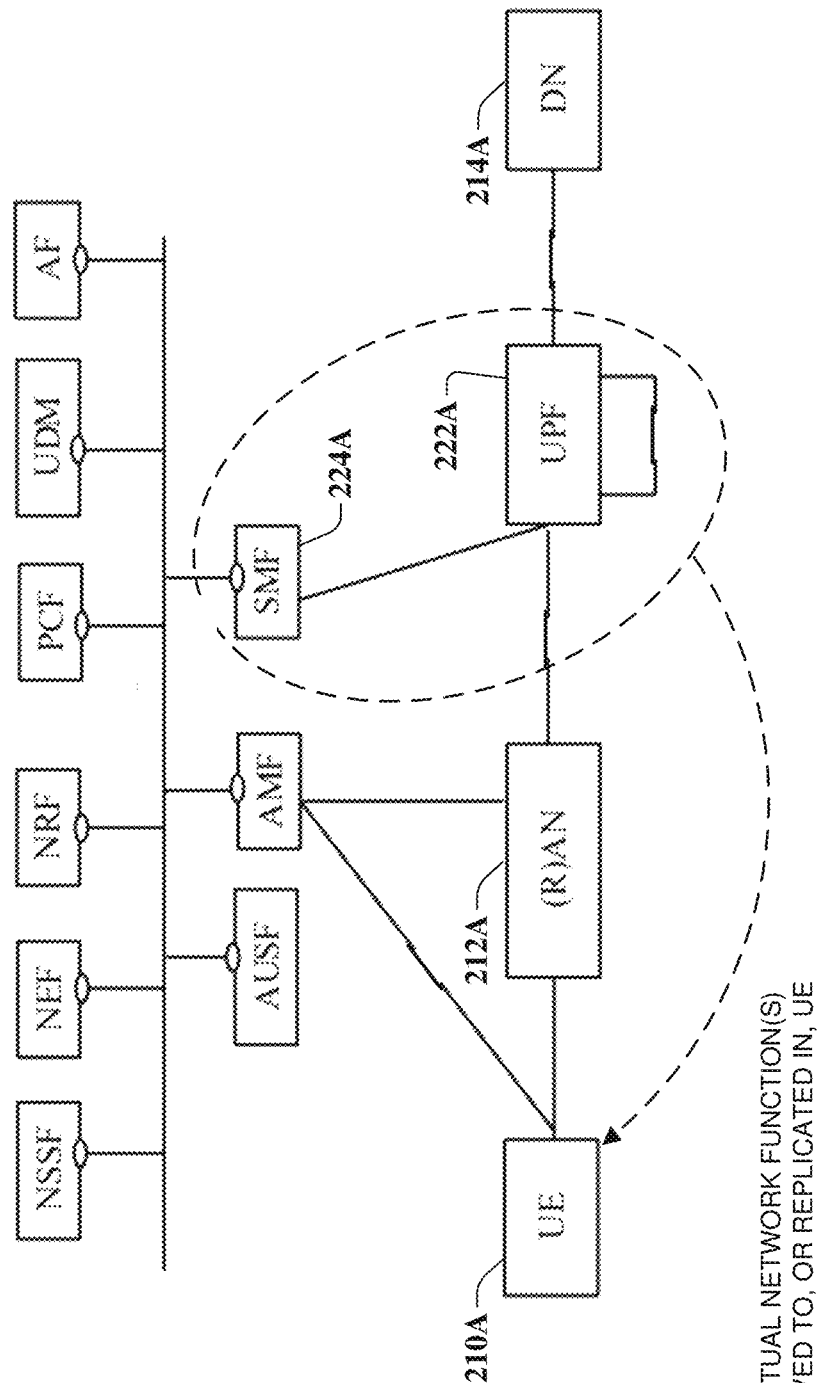
FIG. 2A is a block diagram illustrating an example, non-limiting embodiment of 5G mobile network in which virtual network function(s) are moved to, or replicated in, a user device in accordance with various aspects described herein.

FIG. 2A is a block diagram illustrating an example, non-limiting embodiment of a 5G mobile network in which virtual network function(s) are moved to, or replicated in, a user device in accordance with various aspects described herein. 5G mobile network 200A is shown including radio access network (RAN) 212A, user plane function (UPF) 222A, session management function (SMF) 224A, user equipment (UE) 210A, authentication server function (AUSF), access and mobility management function (AMF), network slice selection function (NSSF), network exposure function (NEF), network repository function (NRF), policy control function (PCF), unified data management (UDM), and application function (AF). Control and user plane separation in 5G networks separates control plane functions and user plane functions. For example, SMF 224A is a control plane function that, among other things, manages sessions, and UPF 222A is a user plane function that routes data to and from providers and consumers of that data.

By separating UPFs from other control plane functions, UPFs can be replicated and the user plane can be scaled up without needlessly duplicating control plane functions. For example, when UE 210A requests streaming video that will be sourced from a content provider in data network 214A, the resulting video stream is typically routed through a user plane function such as UPF 222A to the radio access network 212A, and then to UE 210A. When many UEs are attached to RAN 212A, and each one requests video streams, then UPF 222A may route all of the video streams, or additional UPFs may be instantiated as virtual network functions to scale up the user plane. When the user plane is scaled in this manner, the control plane typically does not need to be scaled as rapidly, as many UPFs may be controlled by fewer control plane network elements (NE).

User plane functions are typically controlled by network elements in the control plane. For example, although UPF 222A routes the data, it does so under the control of SMF 224A. In some embodiments, one or more virtual network functions are moved to, or replicated in, UE 210A. For example, in some embodiments UPF 222A is replicated in UE 210A, and in other embodiments SMF 224A is replicated in UE 210A. In still further embodiments, the combination of UPF 222A and SMF 224A are replicated in UE 210A.

In some embodiments, UE 210A includes a user plane virtual network function such as UPF 222A, and that user plane virtual network function is controlled, or at least partially controlled by control plane communications that leave the 5G core network and pass to the UE across the radio access network.

In other embodiments, UE 210A includes both a user plane virtual network function and a control plane virtual network function. For example, UE 210A may include both UPF and SMF virtual network functions. In these embodiments control plane information may cross the radio access network to communicate with the SMF on UE 210A, and then that SMF may in turn manage the session for the UPF on UE 210A.

In some embodiments extending virtual networks to user equipment may alleviate data bottlenecks at the edge of the network and may also allow for flexibility in data routing and authentication. These and other embodiments are further described below.

Figure 2B:
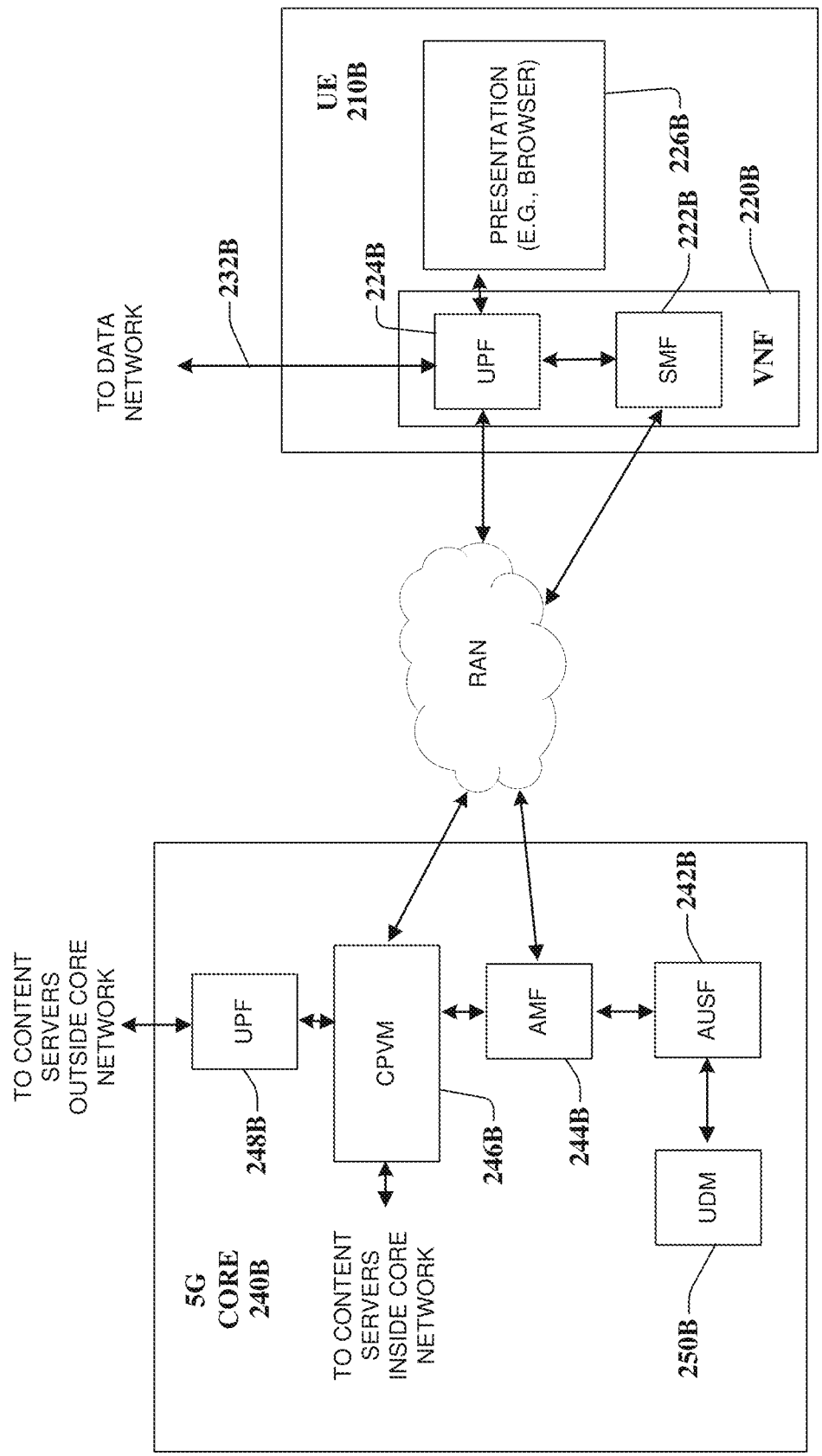
FIG. 2B is a block diagram illustrating an example, non-limiting embodiment of a 5G core and a user device in accordance with various aspects described herein.

FIG. 2B is a block diagram illustrating an example, non-limiting embodiment of a 5G core and a user device in accordance with various aspects described herein. System 200B includes 5G core 240B and UE 210B. 5G core 240B is shown including UPF 248B, control plane video manager (CPVM) 246B, access and mobility function (AMF) 244B, authentication server function (AUSF) 242B, and user data management (UDM) 250B. One skilled in the art will understand that 5G core 240B may include many more network elements than are shown in in FIG. 2B.

UE 210B, also referred to herein as a user device or a mobile device, includes virtual network function 220B and a presentation device, such as a web browser or display screen 226B. Virtual network function 220B may include only a user plane network element, such as UPF 224B, or may include a combination of a user plane network element and a control plane network element, such as the combination of UPF 224B and SMF 222B.

In operation, VNF 220B may be created or enabled only when UE 210B is provisioned to support the services provided by VNF 220B. For example, in some embodiments, VNF 220B functions as a streaming video gateway, and VNF 220B is only created within UE 210B when UE 210B is provisioned for the streaming video services.

An example interaction between UE 210B and 5G core 240B is provided below that results in the creation or enabling of VNF 220B and the consumption of services provided by VNF 220B. When UE 210B first attaches to the radio access network (RAN), VNF 220B either has not been created or is not yet enabled.

After attaching to the RAN, UE 210B establishes a connection to AMF 244B, and AMF 244B queries AUSF 242B and UDM 250B to determine whether UE 210B is provisioned for device enabled virtual network functions such as video gateways. If UE 210B is provisioned with the appropriate profile, AMF 244B sends an authorization stream to UE 210B to communicate that virtual network functions, such as video gateways enabled by user plane virtual network functions, are enabled. In some embodiments, as part of this process, AMF 244B queries CPVM 246B which provides a blockchain entry to AMF 244B that is passed to UE 210B as part of the authorization stream.

In response to receiving the authorization, UE 210B creates or otherwise enables VNF 220B, and appends the blockchain entry to a UE maintained blockchain that may be used by other blockchains to enable security keys used for integrity reference. In some embodiments, the blockchain entry includes a public key that may be used to encrypt video that can only be decrypted using a private key held by VNF 220B.

In some embodiments, when UE 210B requests a video download (either streaming or individual content), UPF 224B requests the content from CPVM 246B. CPVM 246B may validate UE 210B based on the blockchain entry provided when AMF 244B sent the authorization stream. Once UE 210B is validated, CPVM 246B receives content either from servers within the core network or from content servers external to the core network via UPF 248B and provides the download or video stream to UPF 224B. The video may be then be consumed on presentation device 226B.

Because the user plane virtual network function residing on UE 210B is operating as a video gateway, it is not necessary for UE 210B to always have video routed through 5G core 240B. For example, once the virtual network function video gateway is operational on UE 210B, UPF 224B may request video services directly from content servers on the data network (DN) at 232B. Authentication with the content servers on the DN may be enabled by the blockchain entry in the same manner that it is enabled with network elements in 5G core 240B.

Although in FIG. 2B, the CPVM is shown with both control and user plane functions, this is not a limitation. For example, in some embodiments, the CPVM is split into a user plane CPVM and a control plane CPVM. Further, in some embodiments, the functionality of the CPVM as described herein is performed by network elements already in 5G core 240B. For example, the user plane functionality of CPVM 246B may be performed by a UPF, and the control plane functionality of CPVM 246B may be provided by other control plane network elements, such as AUSF, UDM PCF, and AMF.

Although VNF 220B is shown with both control plane (SMF 222B) and user plane (UPF 224B) network elements, this is not a limitation. For example, in some embodiments, VNF 220B only includes user plane functions and control information reaches the user plane functions by crossing the RAN.

UE 210B may be any type of device. For example, in some embodiments, UE 210B is a smartphone or tablet computer. In other embodiments, UE 210B is a smart TV or a set-top box. In still further embodiments, UE 210B may be an automobile. The virtual network functions may be implemented or instantiated in any manner on any device. For example, in some embodiments, the virtual network functions may be natively built-in to network stacks beneath the application layer.

Moving user plane gateways to end user devices improves the performance of the network and enables secure download of content. This also improves the security of video being downloaded or streamed since it is under the control of the carrier network and not under the control of applications. In other words, by moving the security, control and performance of video content being downloaded to carrier control and user plane network elements, the overall performance and monetization of video content is improved.

Figure 2C:
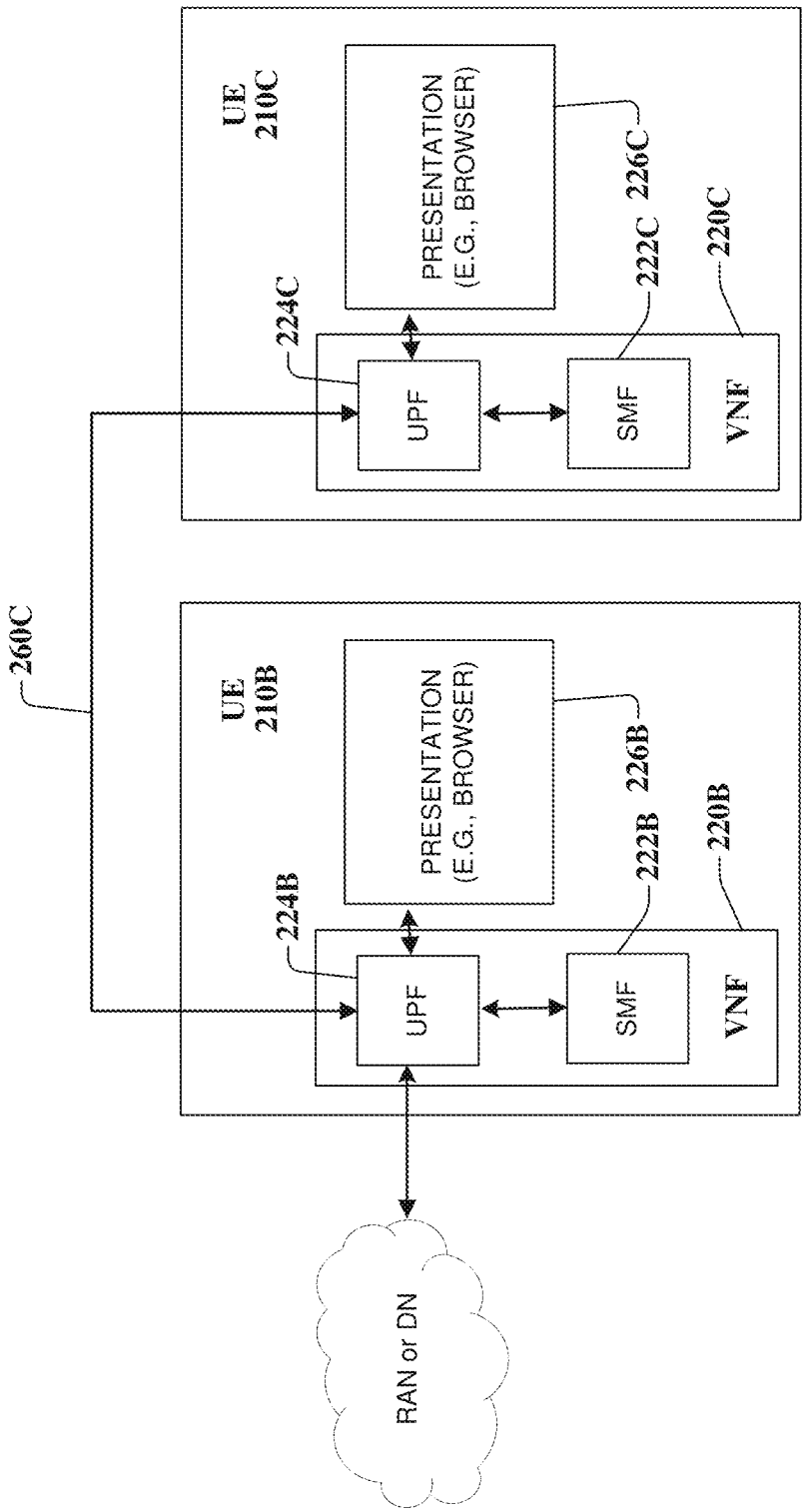
FIG. 2C is a block diagram illustrating an example, non-limiting embodiment of multiple user devices in accordance with various aspects described herein.

FIG. 2C is a block diagram illustrating an example, non-limiting embodiment of multiple user devices in accordance with various aspects described herein. FIG. 2C shows two user devices: UE 210B and UE 210C. Both UE 210B and UE 210C are shown having virtual network functions instantiated. For example, UE 210B includes virtual network function 210B and UE 210C includes virtual network function 220C. Virtual network function 220B is shown including UPF 224B and SMF 222B, and virtual network function 220C is shown including UPF 224C and SMF 222C. UE 210C is also showing including presentation device 226C.

As shown in FIG. 2C, UE 210B communicates with a radio access network or a data network to receive video services at the video gateway implemented by VNF 220B. This operation is described with respect to earlier figures. UE 210C does not have a direct connection to a radio access network or a data network; rather, UE 210C receives video at 260C from the video gateway implemented by VNF 220B in UE 210B. Although UE 210C is shown having a virtual network function that includes UPF 224C and SMF 222C, this is not a limitation. For example, in some embodiments, UE 210C does not include a virtual network function. In these embodiments, the virtual network function 220B in UE 210B serves as the video gateway for both UE 210B and UE 210C.

The connection between UE 210B and 210C may take any form. For example, in some embodiments, UE 210B may act as a WiFi hotspot, and UE 210C may wireless connect to UE 210B. In other embodiments, UE 210B and UE 210C may connect via another wireless protocol such as Bluetooth®. The manner in which connection 260C is implemented is not a limitation.

In some embodiments, UE 210B serves as a video gateway for multiple additional UEs beyond UE 210C. For example, in some embodiments, UE 210B may function as a video gateway appliance at a user premises that serves other user devices at the same user premises. As described above, the user plane of the video gateway implemented by virtual network function 220B may receive control information across a radio access network from control plane functions in a mobile network core.

Figure 2D:
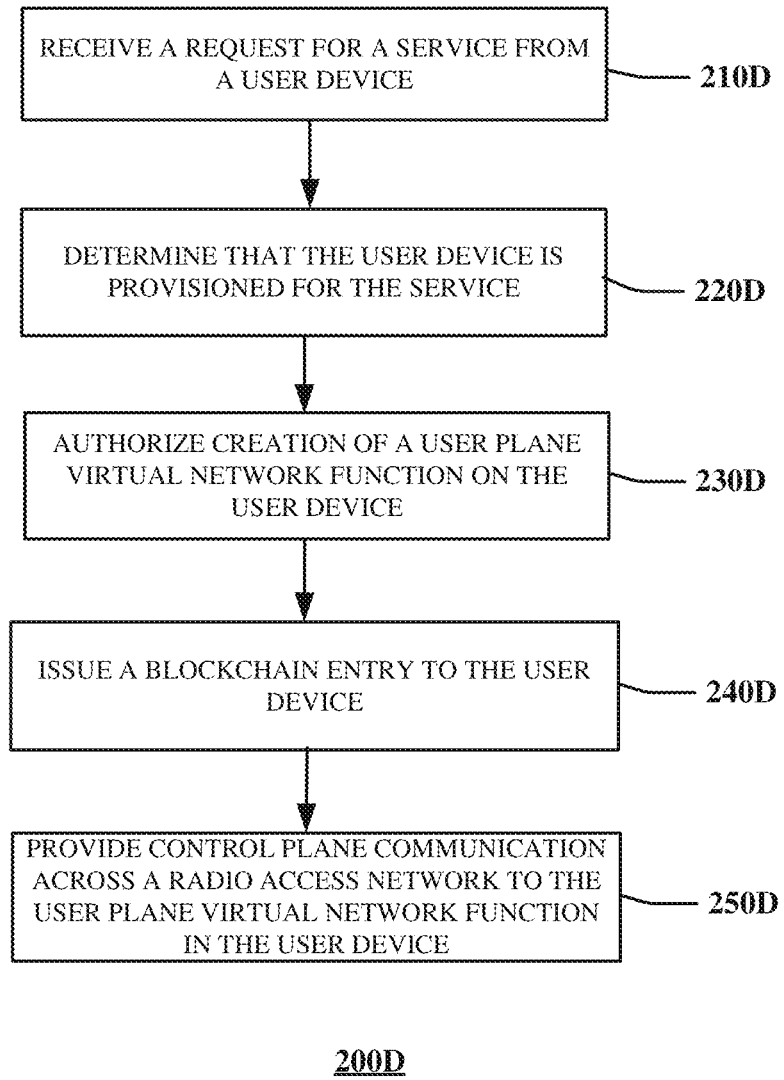
FIG. 2D depicts an illustrative embodiment of a method in accordance with various aspects described herein.

FIG. 2D depicts an illustrative embodiment of a method in accordance with various aspects described herein. Method 200D begins at 210D where a request for a service from a user device is received. In some embodiments, the request for service may be received at a control plane network element in a mobile network core such as CPVM 246B as shown in FIG. 2B. The service request may be for any type of service. For example, the request for a service may include a request for downloadable video, streaming video, or the like. In some embodiments, the request is received from a user device attached to a radio access network of the mobile network, and the request includes a request to create or enable a user plane virtual network function on the user device. In some embodiments, the request is for streaming video service, and the request received at the control plane function of the mobile network includes a request to create a user plane virtual network function to support a streaming video gateway on the user device.

At 220D, it is determined that the user device is provisioned for the requested service. In some embodiments, AMF 244B in combination with AUSF 242B and UDM 250B determine whether a user device requesting the service is provisioned for that particular service. For example, user device 210B (FIG. 2B) may be determined to be provisioned for streaming video.

At 230D, in response to the determination that the user device is provisioned for the service, creation of a user plane virtual network function on the user device is authorized. In some embodiments, this corresponds to an authorization stream being sent to the user device that includes a blockchain entry as well as an encryption key. The actions at 230D result in the distribution of network elements not only throughout a core of the mobile network such as 5G core 240B (FIG. 2B), but also to user devices attached to a radio access network of the mobile network. For example, as a result of the actions at 230D, a user plane video gateway which otherwise would be included within the core or at the edge of the mobile network, is now on the other side of the radio access network as part of a virtual network function created or enabled in a user device.

At 240D, the blockchain entry is issued to the user device. In some embodiments, the user device may add the blockchain entry to a blockchain that is used to maintain a Ledger of virtual network functions created, enter provide authentication services.

At 250D, control plane communications are provided across the radio access network to the user plane virtual network function in the user device. For example, a user plane virtual network function such as a 5G UPF maybe created or enable to function as a user plane video gateway in a user device, and a 5G SMF within the 5G core may provide control plane information across the radio access network to provide control the virtual network function within the user device. In other embodiments, a control plane function may be created or enabled along with the user plane function in the virtual network function within the user device. For example, a virtual network function within a user device may include both a 5G UPF and a 5G SMF, and control plane communications may be provided across the radio access network to one or both of the functions within virtual network function on the user device.

Figure 2E:
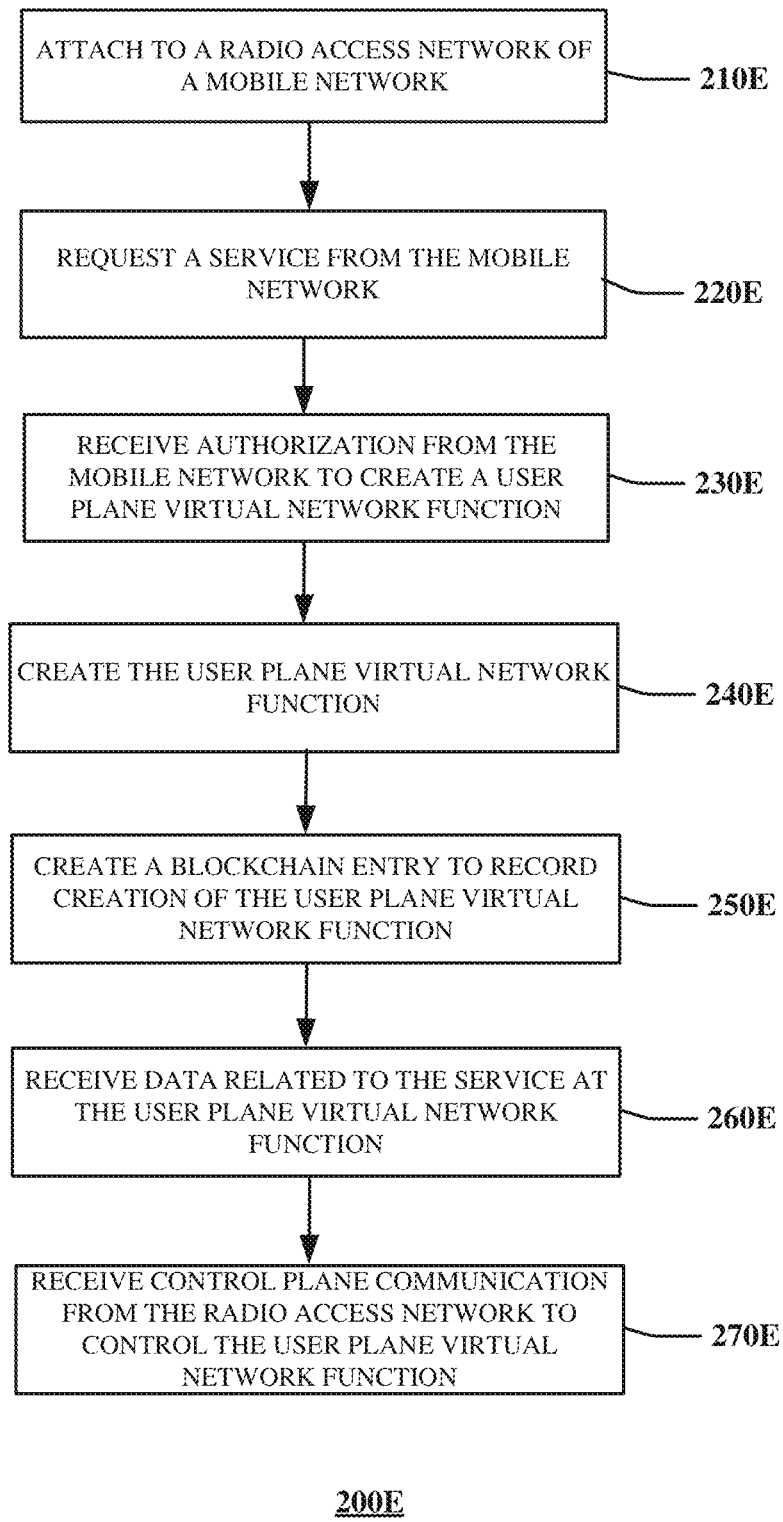
FIG. 2E depicts an illustrative embodiment of a method in accordance with various aspects described herein.

FIG. 2E depicts an illustrative embodiment of a method in accordance with various aspects described herein. Method 200E begins at 210E where a user device attaches to a radio access network of a mobile network. In some embodiments, this corresponds to a user device attaching to a radio access network of a 5G mobile network, a 4G mobile network, or the like. The device attaching to the radio access network may be any type of device. For example, the user device attaching to the radio access network may be a mobile phone, a tablet computer, a smart TV, a smart hub in a home, or any other type of device.

At 220E, a service is requested from the mobile network. In some embodiments, this corresponds to the user device requesting a streaming video service, a downloaded video, or any other service involving data that will travel across a user plane of the mobile network. At 230E, authorization is received from the mobile network to create or enable a user plane virtual network function in the user device. For example, an authorization may be received to create or enable a user plane virtual network function to implement a video gateway on the user device. The authorization may include not only authorization to create or enable a virtual network function, but may also include a blockchain entry that may be used to create a ledger of virtual network functions on the user device as well as an encryption key that may be used for authentication and/or decryption of video streams.

At 240E, the user plane virtual network function is created or enabled in the user device. In some embodiments, this corresponds to the user device creating or enabling a 5G UPF to function as a user plane video gateway within the user device. In some embodiments, a control plane function is also created or enabled within the virtual network function on the user device. For example, a session management function may be created or enabled along with the user plane function created in the virtual network function within the user device. At 250E, a blockchain entry is created within the user device to record creation or enablement of the user plane virtual network function.

At 260E, data related to the service is received at the user plane virtual network function within the user device. For example, in some embodiments, streaming video data is received at the virtual network function operating as a user plane video gateway. The data received may be received across the radio access network or may be received from any other connected source. For example, because the virtual network function within the user device is operating as a video gateway, video may be received from any source available to the video gateway and routed appropriately within the user device.

Further, in some embodiments the video gateway within the user device serves not only the user device within which the video gateway resides, but also routes video to other user devices without going back through the radio access network. For example, one user device in a user premises may include a virtual network function corresponding to a virtual network function for a mobile network, and that virtual network function may provide user plane functionality for other user devices at the user premises. This results in virtual network elements being distributed not only within the core of a mobile network, but also across the radio access network and into user devices.

At 270E control plane communications are received from the radio access network to control the user plane virtual network function. For example, a 5G UPF within a virtual network function on a user device may receive control plane information from a session management function within the core network where that control information travels across the radio access network to reach the UPF in the user device. In other embodiments, control plane functions are also created or enabled within the virtual network function on the user device and control plane information may be received across the radio access network to communicate with both user plane functions and control plane functions within the virtual network function on the user device.

While for purposes of simplicity of explanation, the respective processes are shown and described as a series of blocks in FIGS. 2D and 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIGS. 2A-2E have been described using 5G nomenclature, however the various embodiments are not limited to 5G systems. For example, in 4G embodiments, UPFs are implemented as serving gateways and packet data network gateways, and the functionality of AMF 244B, AUSF 242B, and UDM 250B is provided by a mobility management entity (MME) and a home subscriber server (HSS). Also for example, in some embodiments, including in systems beyond 5G, the devices and functionality described herein may be implemented in network elements having different names and acronyms but similar functionality.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and methods 200D and 200E presented in FIGS. 1, 2A, 2B, 2C, 2D, and 2E. For example, virtualized communication network 300 can facilitate in whole or in part the creation and enablement of virtual network functions in mobile devices resulting in virtual network elements for a single mobile network residing on both sides of a radio access network. In some embodiments, control plane information crosses the radio access network to control user plane functions on the other side of the radio access network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
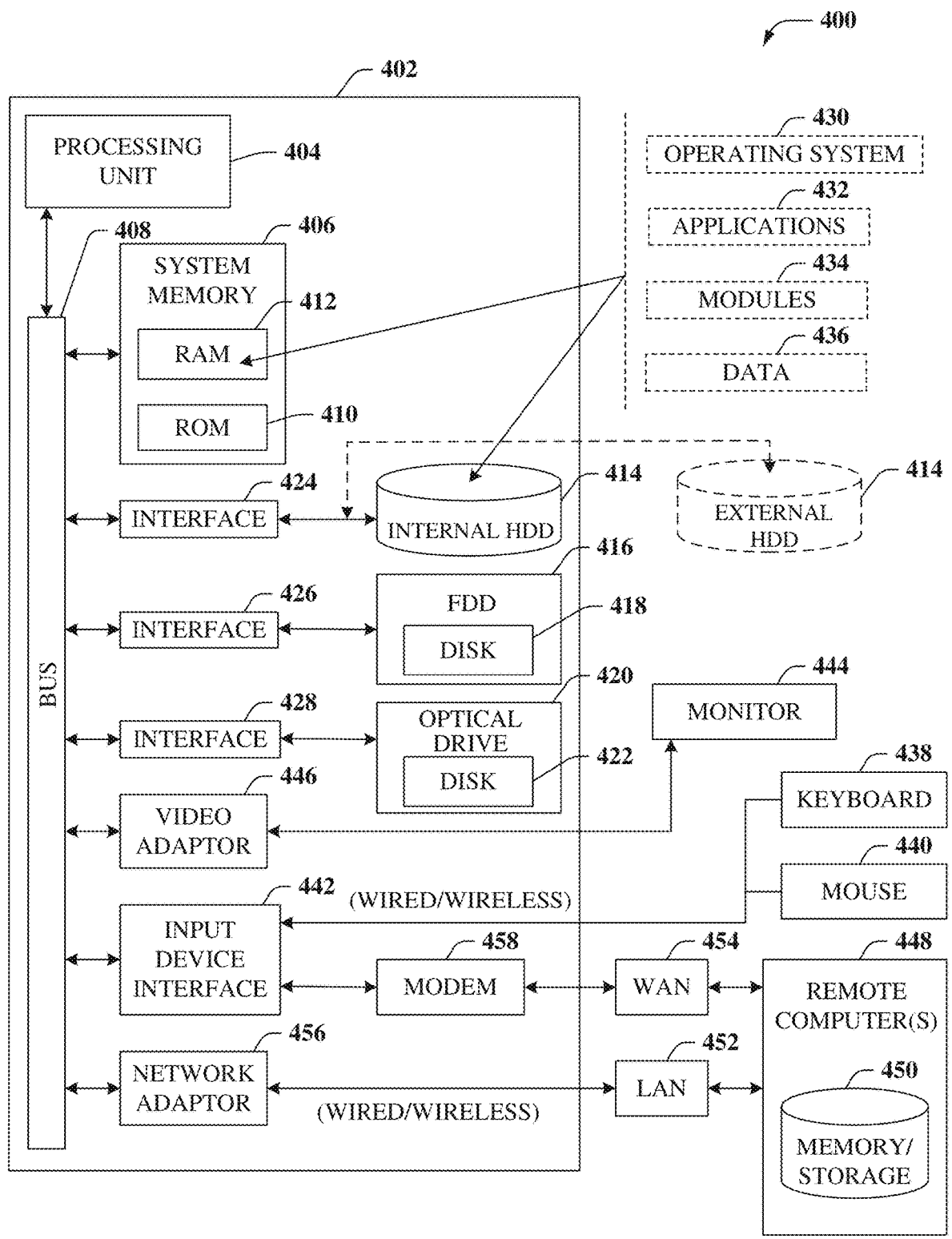
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, CPVM 246B, UE 210B, UE 210C, etc. Each of these devices can be implemented via computer-executable instructions that can run on one or more computers, and/or in combination with other program modules and/or as a combination of hardware and software. For example, computing environment 400 can facilitate in whole or in part the creation or enabling of virtual network functions on a user device, as well maintaining a blockchain for authentication and security management.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
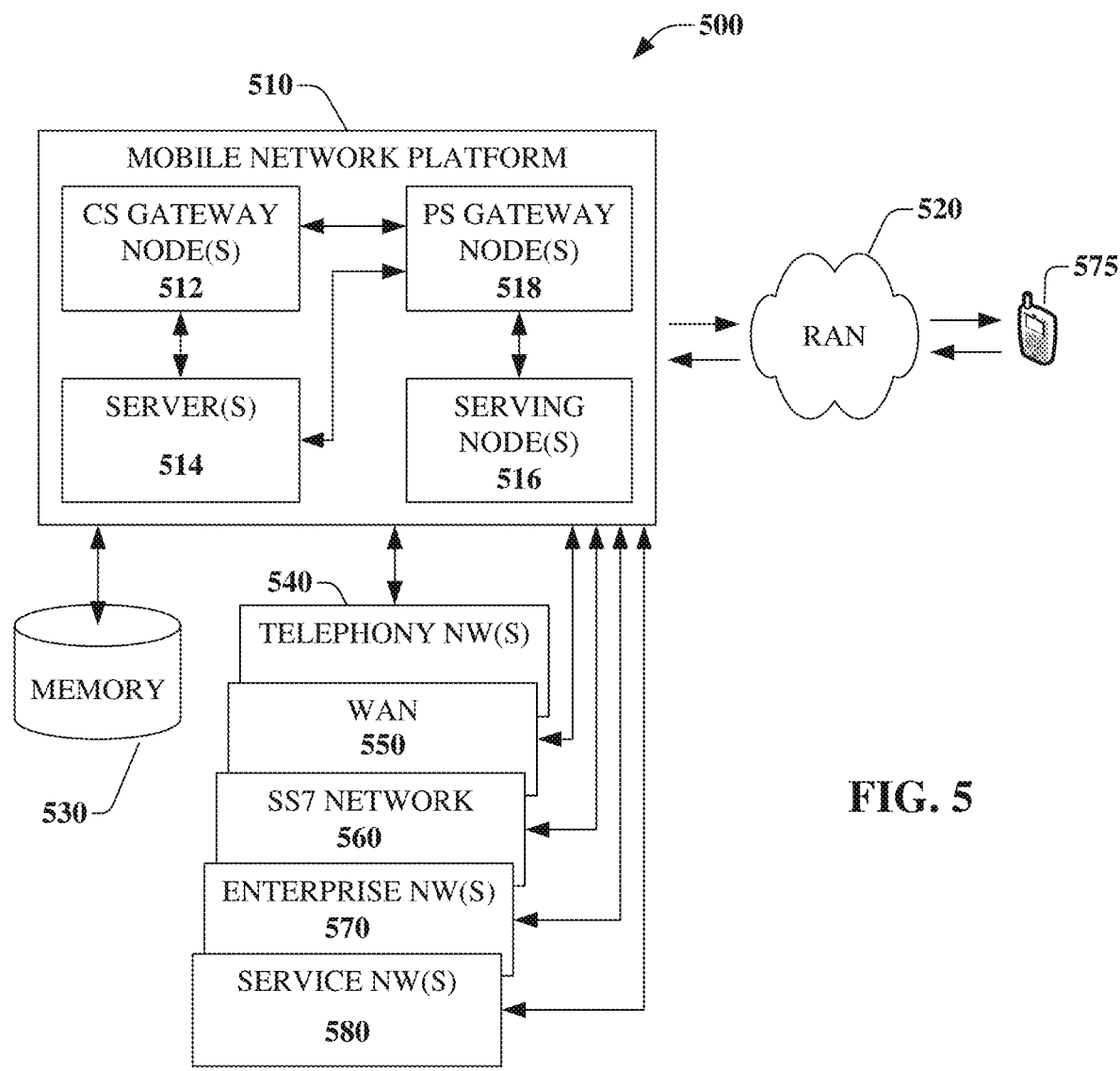
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part the authorization of the creation or enabling of virtual network functions in user device 575. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a user device 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1($s$) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
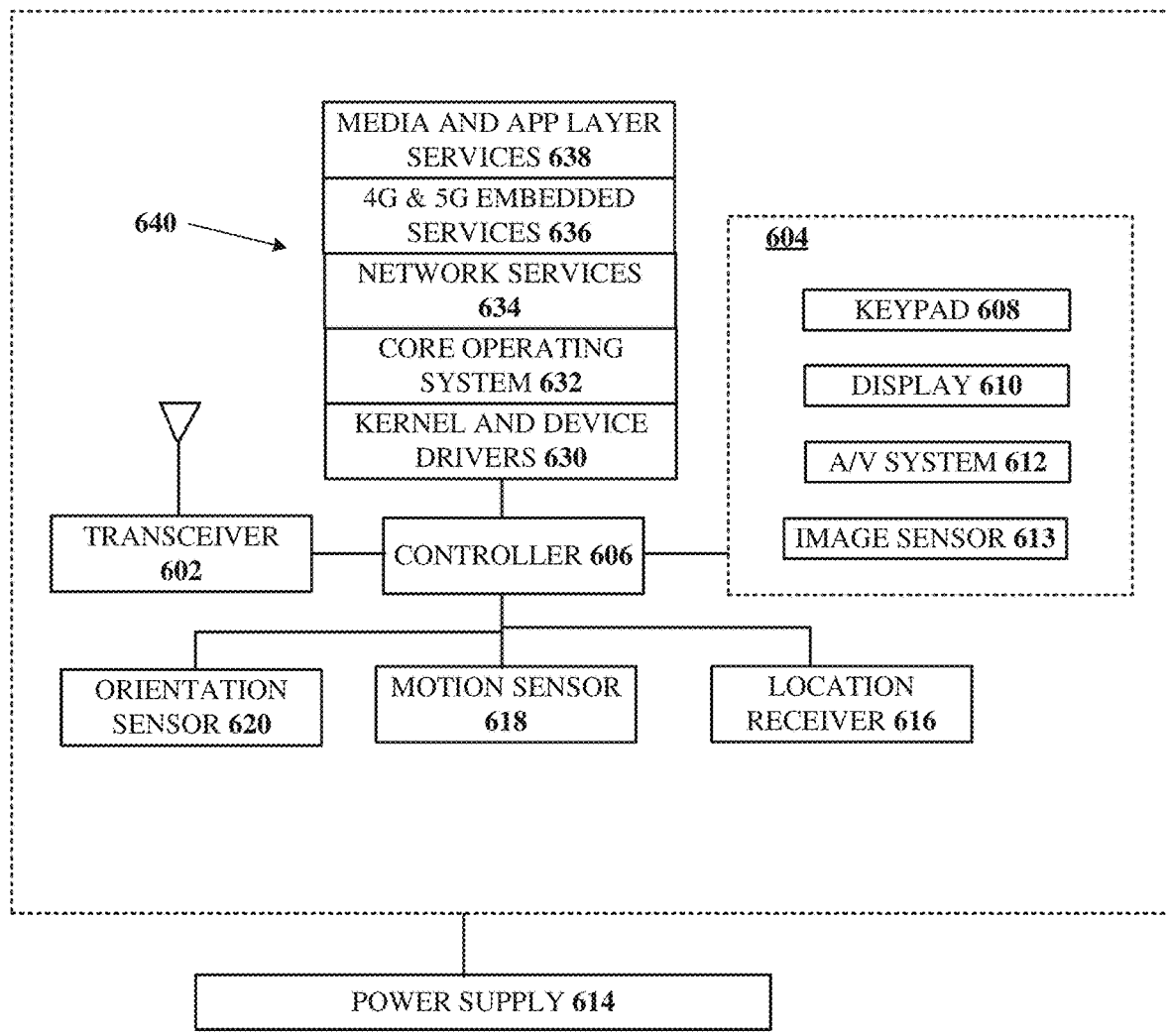
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as UE 210B, UE 210C, data terminals 114, mobile devices 124, vehicle 126, display devices 144 or other client devices for communication via either communications network 125. For example, computing device 600 can facilitate in whole or in part the creation or enabling of virtual network functions to function as, for example, user plane video gateways in user devices.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Network stack 640 includes kernel and device drivers 630, core operating system 632, network services 634, 4G and 5G embedded services 636, and media and app layer services 638. In some embodiments virtual network function functionality is included organically within the network stack of mobile devices. For example, 4G and 5G embedded services 636 may include virtual network functionality that allows communication device 600 to create or enable user plane virtual network functions on communication device 600. This provides communication device 600 the ability to implement a user plane video gateway as described above with reference to previous figures.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A mobile device, comprising:
a processing system including a processor; and
a memory that stores executable instructions that, when executed by the processing system, facilitate performance of operations, the operations comprising:
attaching the mobile device to a radio access network of a mobile network;
requesting, by the mobile device, a service from the mobile network;
receiving authorization from the mobile network to create a user plane virtual network function on the mobile device;
creating the user plane virtual network function on the mobile device attached to the radio access network of the mobile network, wherein the user plane virtual network function supports the service;
creating a blockchain entry on the mobile device to record creation of the user plane virtual network function on the mobile device; and
receiving data related to the service at the user plane virtual network function on the mobile device attached to the radio access network of the mobile network.

2. The mobile device of claim 1 wherein the service comprises a video service.

3. The mobile device of claim 1 wherein the receiving data comprises receiving data from the mobile network.

4. The mobile device of claim 1 wherein the receiving data comprises receiving data from a source other than the mobile network.

5. The mobile device of claim 1 wherein the operations further comprise receiving control plane communications from a control plane virtual network function within the mobile network to provide control to the user plane virtual network function on the mobile device.

6. The mobile device of claim 1 wherein the operations further comprise creating a control plane user function on the device.

7. The mobile device of claim 1 wherein the user plane virtual network function comprises a 5G user plane function (UPF).

8. The mobile device of claim 1 wherein the user plane virtual network function comprises a 4G user plane serving gateway (SGW-U).

9. The mobile device of claim 1 wherein the receiving authorization comprises receiving an encryption key, and the creating the blockchain entry comprises including the encryption key in the blockchain entry, and wherein the memory has a decryption key stored therein used to decrypt video streams encrypted by the encryption key.

10. A non-transitory machine-readable medium, comprising executable instructions that, when executed by a processing system including a processor, facilitate performance of operations, the operations comprising:
receiving, at a control plane function in a mobile network, a request, from a mobile device attached to a radio access network of the mobile network, to create a user plane virtual network function on the mobile device attached to the radio access network of the mobile network;
authorizing creation of the user plane virtual network function on the mobile device attached to the radio access network of the mobile network;
causing a blockchain entry to be issued to the mobile device attached to the radio access network of the mobile network to create a ledger entry recording creation of the user plane virtual network function on the mobile device attached to the radio access network of the mobile network; and
providing control plane communication across the radio access network to provide control to the user plane virtual network function on the mobile device attached to the radio access network of the mobile network.

11. The non-transitory machine-readable medium of claim 10 wherein:
the receiving a request to create the user plane virtual network function comprises receiving a request for a service to be supported by the user plane virtual network function.

12. The non-transitory machine-readable medium of claim 11, wherein the operations further comprise, responsive to the receiving the request for the service, determining that the mobile device is provisioned for the service.

13. The non-transitory machine-readable medium of claim 10 wherein the user plane virtual network function comprises a 4G user plane serving gateway (SGW-U).

14. The non-transitory machine-readable medium of claim 10 wherein the operations further comprise authorizing creation of a control plane virtual network function on the mobile device.

15. The non-transitory machine-readable medium of claim 14 wherein the user plane virtual network function comprises a 5G user plane function (UPF) and the control plane virtual network function comprises a 5G function (SWF).

16. A method, comprising:
receiving, by a processing system including a processor and at a control plane function in a mobile network, a request for a service from a mobile device attached to a radio access network of the mobile network;
determining, by the processing system, that the mobile device attached to the radio access network of the mobile network is provisioned for the service;
authorizing, by the processing system, creation of a user plane virtual network function on the mobile device attached to the radio access network of the mobile network; and
issuing, by the processing system, a blockchain entry to the mobile device attached to the radio access network of the mobile network to create a ledger entry recording creation of the user plane virtual network function on the mobile device attached to the radio access network of the mobile network.

17. The method of claim 16 wherein the service comprises streaming video.

18. The method of claim 17 further comprising:
receiving, by the processing system, a request for the streaming video; and
providing, by the processing system, the streaming video to the user plane virtual network function on the mobile device.

19. The method of claim 16 wherein the service comprises downloaded video.

20. The method of claim 16 further comprising providing control plane communication across the radio access network to provide control to the user plane virtual network function on the mobile device.

\* \* \* \* \*